US009768427B2

(12) United States Patent
Lee et al.

(10) Patent No.: US 9,768,427 B2
(45) Date of Patent: Sep. 19, 2017

(54) BATTERY MODULE ASSEMBLY OF IMPROVED RELIABILITY AND BATTERY PACK EMPLOYED WITH THE SAME

(71) Applicant: LG CHEM, LTD., Seoul (KR)

(72) Inventors: BumHyun Lee, Seoul (KR); JiYoung Choi, Yongin-si (KR); DalMo Kang, Daejeon (KR); JunYeob Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 446 days.

(21) Appl. No.: 14/243,660

(22) Filed: Apr. 2, 2014

(65) Prior Publication Data

US 2014/0212723 A1 Jul. 31, 2014

Related U.S. Application Data

(63) Continuation of application No. PCT/KR2012/010877, filed on Dec. 14, 2012.

(30) Foreign Application Priority Data

Dec. 14, 2011 (KR) ........................ 10-2011-0134170

(51) Int. Cl.
*H01M 2/10* (2006.01)
*H01M 2/20* (2006.01)
*B60L 11/18* (2006.01)
*H01M 2/02* (2006.01)

(52) U.S. Cl.
CPC ....... *H01M 2/1077* (2013.01); *H01M 2/0267* (2013.01); *H01M 2/1094* (2013.01); *H01M 2/206* (2013.01); *B60L 11/1879* (2013.01); *H01M 2/021* (2013.01); *H01M 2/0212* (2013.01); *H01M 2/0217* (2013.01); *H01M 2/0277* (2013.01); *H01M 2/0285* (2013.01); *H01M 2/0287* (2013.01); *H01M 2220/20* (2013.01); *Y02T 10/705* (2013.01)

(58) Field of Classification Search
None
See application file for complete search history.

(56) References Cited

U.S. PATENT DOCUMENTS

| 6,224,995 | B1 | 5/2001 | Fauteux et al. |
| 6,524,732 | B1* | 2/2003 | Iwaizono ............. H01M 10/42 429/100 |
| 2004/0033416 | A1 | 2/2004 | Kim et al. |
| 2004/0058223 | A1 | 3/2004 | Shibata et al. |
| 2005/0031946 | A1 | 2/2005 | Kruger et al. |
| 2005/0260488 | A1 | 11/2005 | Zhou et al. |
| 2005/0271952 | A1 | 12/2005 | Jung |
| 2006/0214631 | A1 | 9/2006 | Yoon et al. |
| 2009/0017366 | A1 | 1/2009 | Wood et al. |
| 2009/0220853 | A1 | 9/2009 | Yang et al. |
| 2009/0226806 | A1 | 9/2009 | Kiya |
| 2009/0305116 | A1 | 12/2009 | Yang et al. |
| 2009/0311581 | A1 | 12/2009 | Park et al. |
| 2009/0325043 | A1 | 12/2009 | Yoon et al. |
| 2010/0009251 | A1* | 1/2010 | Shin ....................... H01M 2/206 429/158 |
| 2010/0136420 | A1 | 6/2010 | Shin et al. |
| 2010/0297482 | A1 | 11/2010 | Yoon et al. |
| 2011/0045335 | A1 | 2/2011 | Lee et al. |
| 2011/0076531 | A1 | 3/2011 | Lee et al. |
| 2011/0117394 | A1 | 5/2011 | Hwang et al. |
| 2011/0129696 | A1 | 6/2011 | Baek |
| 2011/0135994 | A1 | 6/2011 | Yang et al. |
| 2011/0189515 | A1 | 8/2011 | Yoon et al. |
| 2011/0244144 | A1 | 10/2011 | Uchida |
| 2012/0015236 | A1 | 1/2012 | Spare |
| 2012/0121965 | A1* | 5/2012 | Makino ................... H01M 2/22 429/156 |
| 2012/0315522 | A1 | 12/2012 | Shin et al. |
| 2013/0078487 | A1 | 3/2013 | Shin et al. |

FOREIGN PATENT DOCUMENTS

| CN | 1925201 A | 3/2007 |
| CN | 101395737 A | 3/2009 |
| CN | 101395740 A | 3/2009 |
| CN | 102208591 A | 10/2011 |
| EP | 1309018 A2 | 5/2003 |
| EP | 2 299 521 A2 | 3/2011 |
| JP | 2-177250 A | 7/1990 |
| JP | 2002-141036 A | 5/2002 |
| JP | 2003-7271 A | 1/2003 |
| JP | 2004-79434 A | 3/2004 |
| JP | 2009-529216 A | 8/2009 |
| JP | 2009-529217 A | 8/2009 |
| JP | 2009-537944 A | 10/2009 |
| JP | 2010-519676 A | 6/2010 |
| KR | 10-2007-0112489 A | 11/2007 |
| KR | 10-2008-0027504 A | 3/2008 |
| KR | 10-2008-0027506 A | 3/2008 |
| KR | 10-2008-0036258 A | 4/2008 |
| KR | 10-2009-0010426 A | 1/2009 |
| KR | 10-2009-0052802 A | 5/2009 |
| KR | 10-2011-0066774 A | 6/2011 |
| KR | 10-2011-0112896 A | 10/2011 |
| WO | WO 02/32503 A1 | 4/2002 |
| WO | WO 2010/114318 A2 | 10/2010 |
| WO | WO 2011/040297 A1 | 4/2011 |
| WO | WO 2011/152668 A2 | 12/2011 |

OTHER PUBLICATIONS

International Search Report, issued in PCT/KR2012/010877, dated Mar. 8, 2013.

* cited by examiner

*Primary Examiner* — Ladan Mohaddes
(74) *Attorney, Agent, or Firm* — Birch, Stewart, Kolasch & Birch

(57) ABSTRACT

Disclosed herein is a battery module assembly including two or more battery modules having cell units, each of which includes one or more battery cells having insulating tape at least partially attached to an outer circumference thereof excluding electrode terminals thereof, electrically connected to one another, a pair of an upper case and a lower case to surround an upper part and a lower part of the battery modules in a state in which the battery modules are erected on their sides, a bus bar assembly disposed at a front of the battery modules to electrically connect the battery modules to one another, and fastening holes formed at a top of the upper case and a bottom of the lower case to position or fix the battery module assembly.

17 Claims, 9 Drawing Sheets

[FIG. 1]
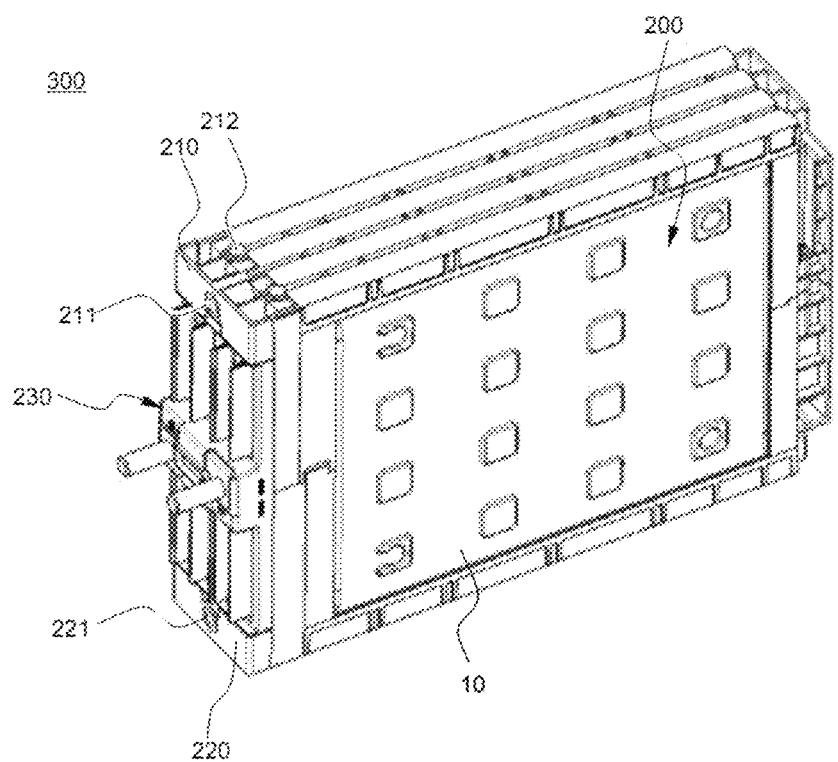

【FIG. 2】
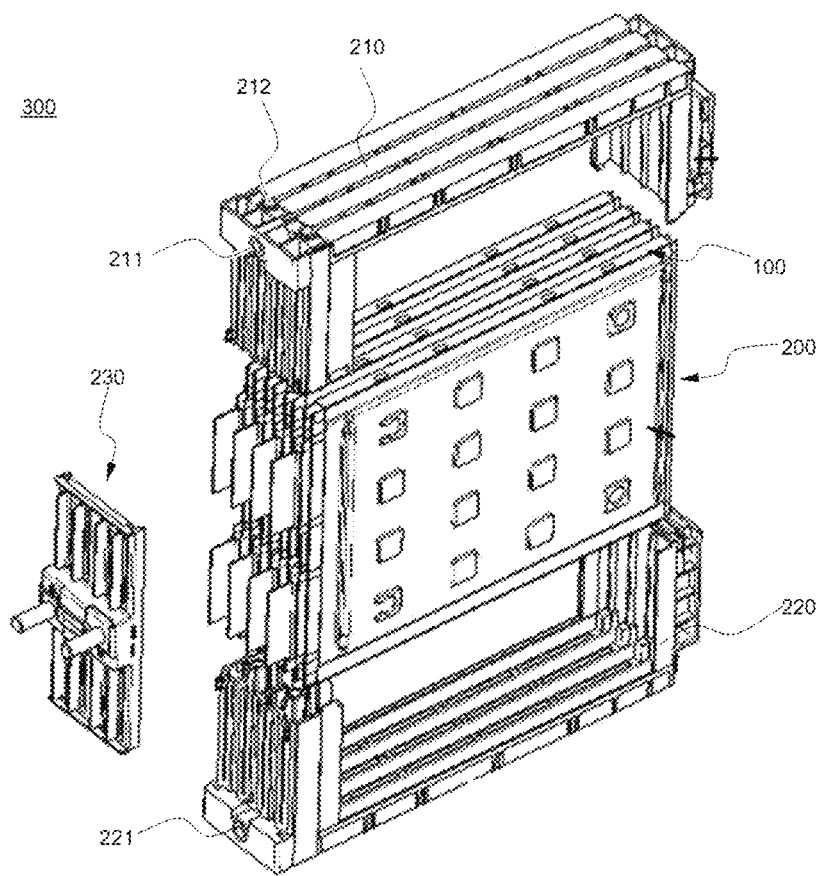

[FIG. 3]
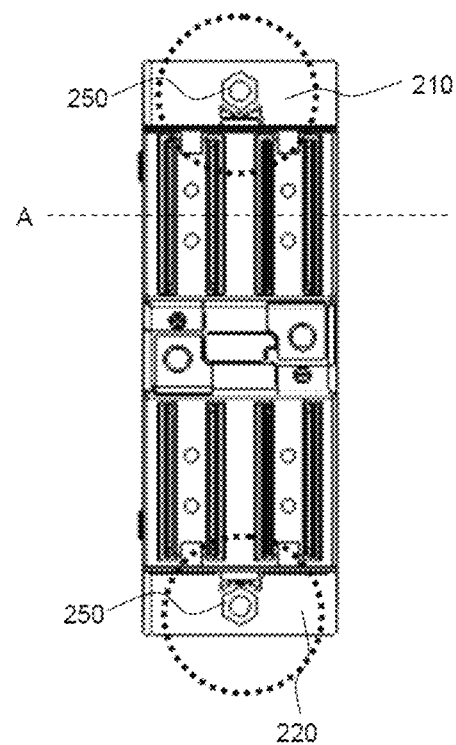

【FIG. 4】
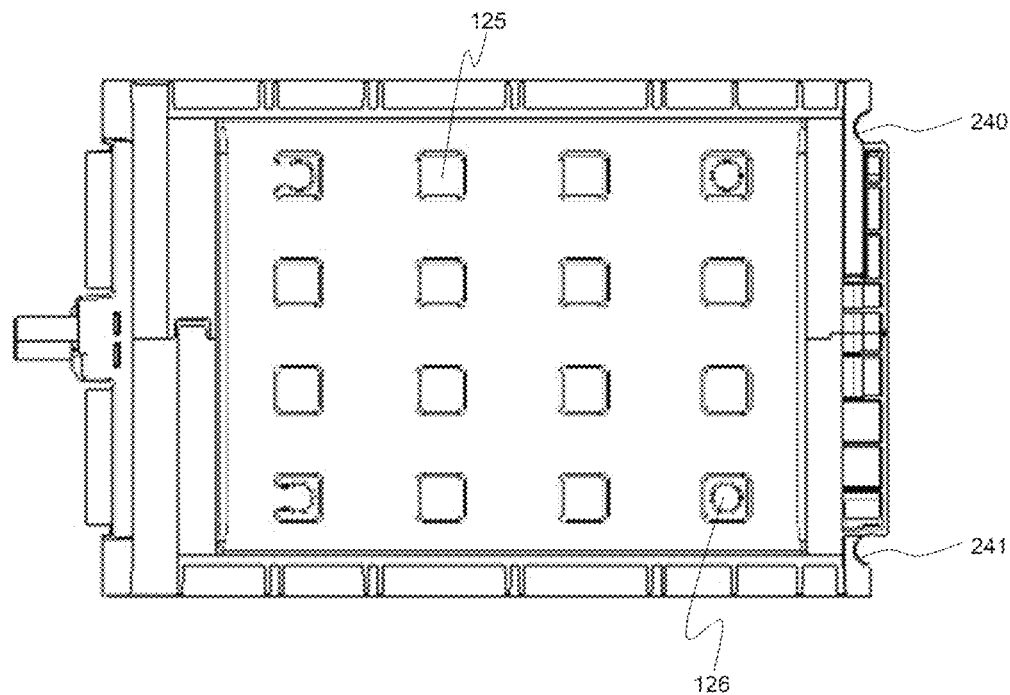
【FIG. 5】
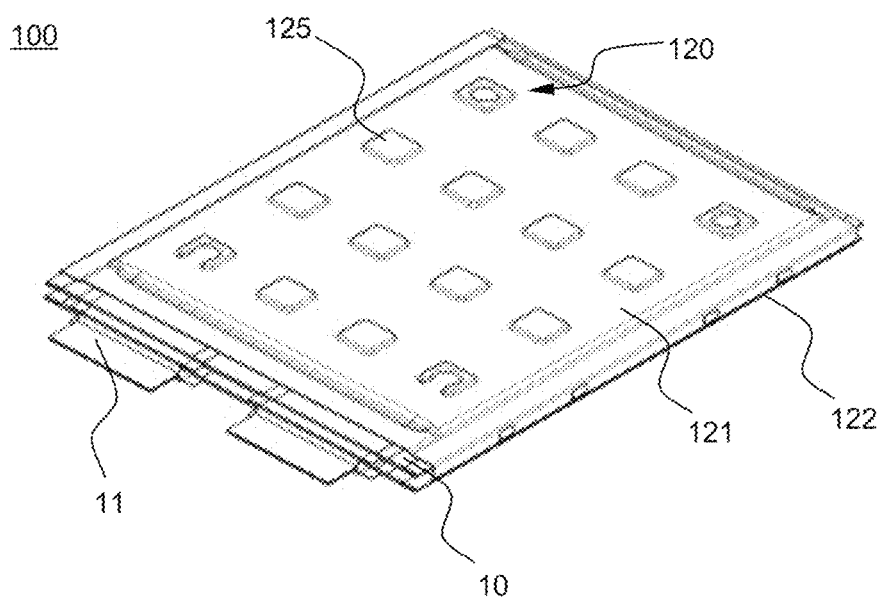

[FIG. 6]
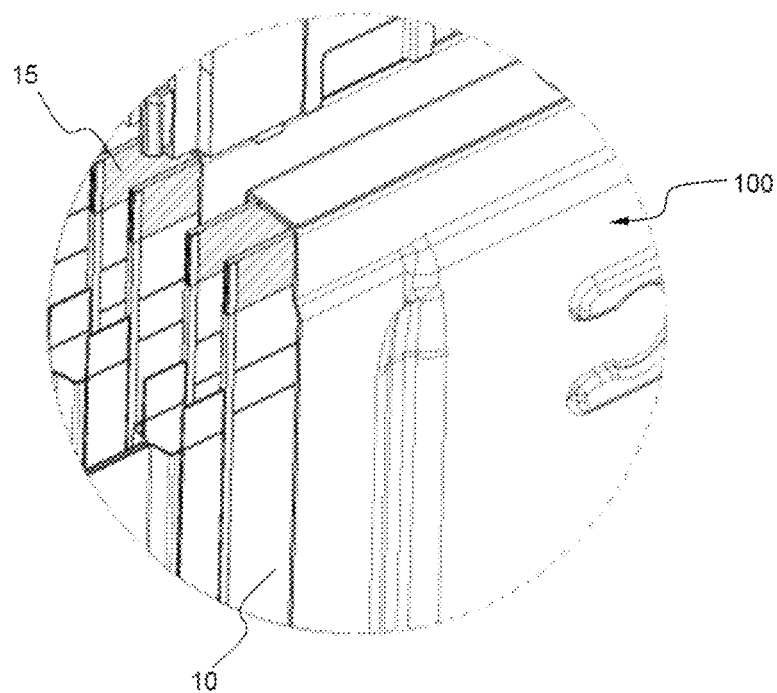

[FIG. 7]
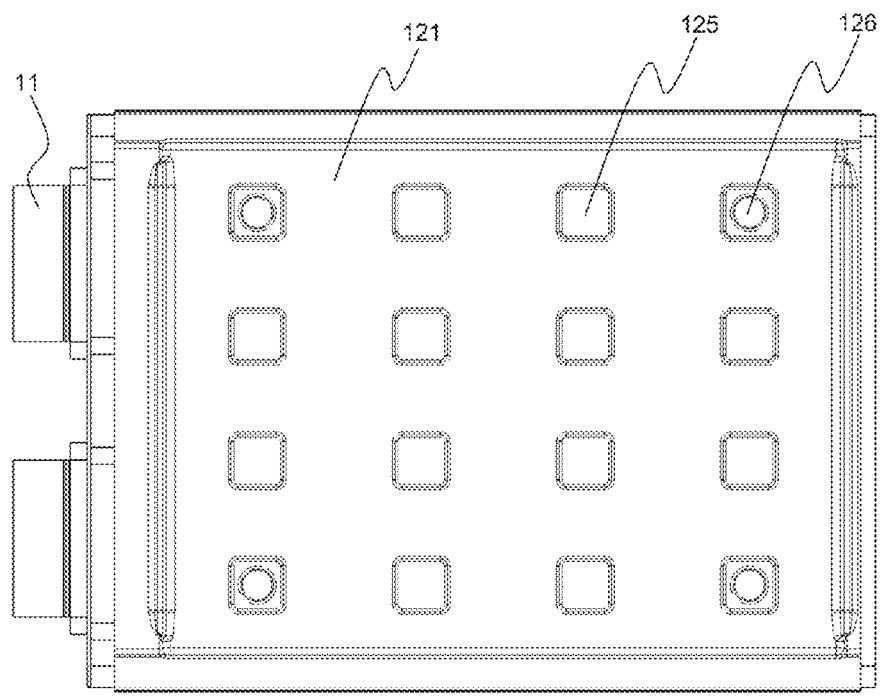

[FIG. 8]
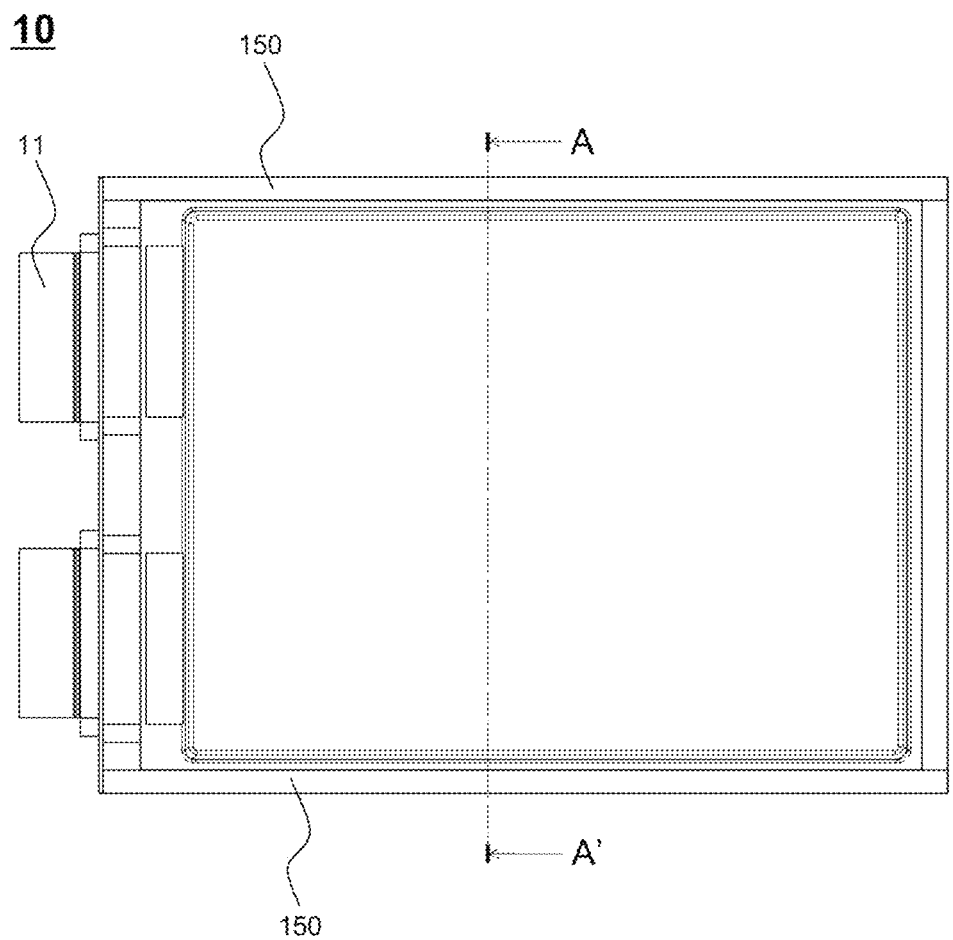

[FIG. 9]
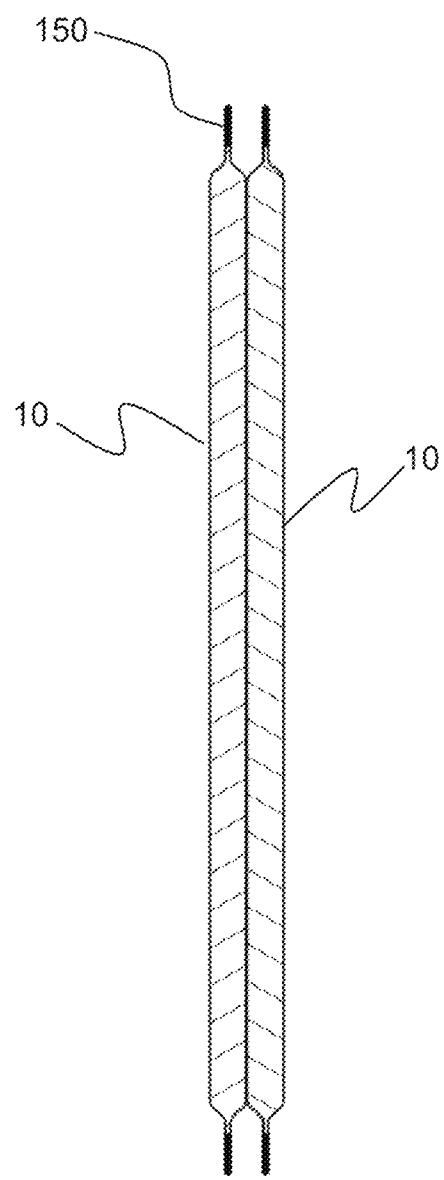

[FIG. 10]
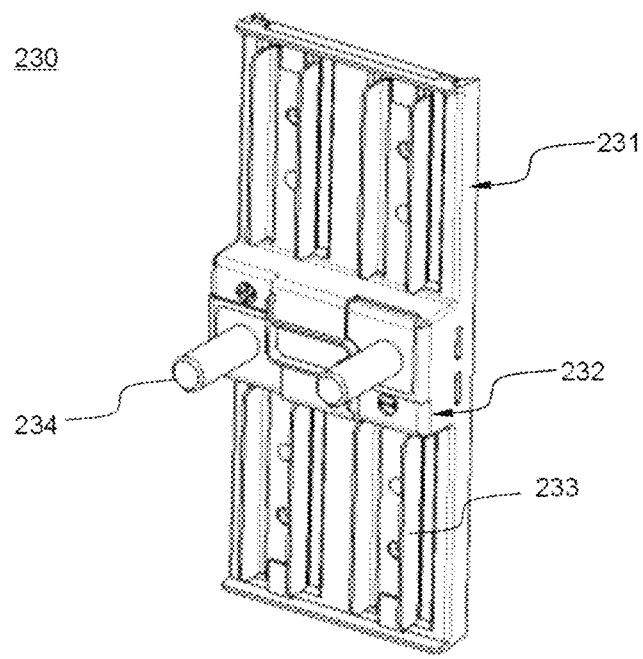
[FIG. 11]
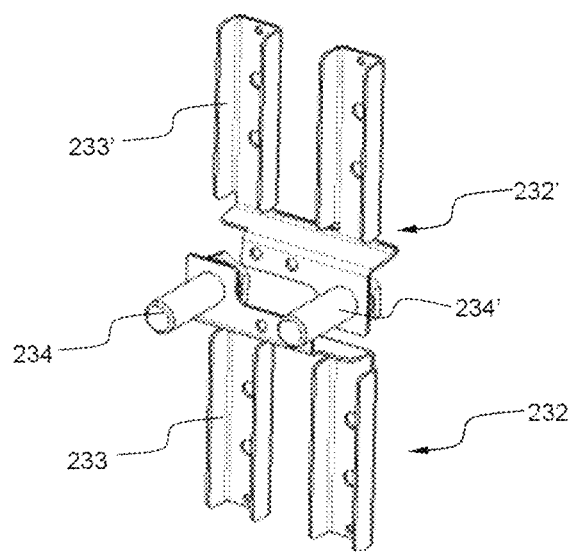

BATTERY MODULE ASSEMBLY OF IMPROVED RELIABILITY AND BATTERY PACK EMPLOYED WITH THE SAME

CROSS REFERENCE TO RELATED APPLICATIONS

This application is a Continuation of PCT International Application No. PCT/KR2012/010877 filed on Dec. 14, 2012, which claims the benefit of Patent Application No. 10-2011-0134170 filed in the Republic of Korea on Dec. 14, 2011, all of which are hereby expressly incorporated by reference into the present application.

TECHNICAL FIELD

The present invention relates to a battery module assembly with improved reliability and a middle or large-sized battery pack including the same and, more particularly, to a battery module assembly including two or more battery modules having cell units, each of which includes one or more battery cells having insulating tape at least partially attached to an outer circumference thereof excluding electrode terminals thereof, electrically connected to one another, a pair of an upper case and a lower case to surround an upper part and a lower part of the battery modules in a state in which the battery modules are erected on their sides, a bus bar assembly disposed at a front of the battery modules to electrically connect the battery modules to one another, and fastening holes formed at a top of the upper case and a bottom of the lower case to position or fix the battery module assembly.

BACKGROUND ART

Recently, a secondary battery, which can be charged and discharged, has been widely used as an energy source for wireless mobile devices. In addition, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery pack having a plurality of battery cells electrically connected to one another because high output and large capacity are necessary for the middle or large-sized devices.

Preferably, the middle or large-sized battery pack is manufactured so as to have as small a size and weight as possible. For this reason, a prismatic battery or a pouch-shaped battery, which can be stacked with high integration and has a small weight to capacity ratio, is usually used as a battery cell of the middle or large-sized battery pack. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

In order for the middle or large-sized battery pack to provide output and capacity required by a specific apparatus or device, it is necessary for the middle or large-sized battery pack to be configured to have a structure in which a plurality of battery cells is electrically connected in series to each other or in series and parallel to each other and the battery cells are stable against external force.

Specifically, when the battery cells are connected in parallel to each other, electrode terminals of the respective battery cells are connected to each other by one to one welding at a single weld point.

When three or more battery cells are connected in parallel to one another while being stacked, however, three or more connections between the electrode terminals of the battery cells are needed with the result that the structure of the battery pack becomes complicated and internal resistance increases when the same region is welded.

Meanwhile, a conventional battery pack is generally manufactured by fixing battery modules to a base plate and using an end plate and a support bar for a portion of battery modules in order to secure dynamic stability.

However, the battery pack having the above structure has spatial limitations in mounting the battery modules therein. In a case in which a large number of battery modules are used to constitute the battery pack, the structural stability of the battery pack is lowered.

In addition, the conventional battery pack is configured to have a structure in which the battery modules are fixed to the base plate using bolts or nuts such that the battery modules cannot be moved upward and downward and the battery modules are fixed in the longitudinal direction using the end plate and the support bar in order to secure dynamic stability.

In the battery pack having the above structure, however, the battery modules are fixed to the base plate using fastening members, such as a plurality of bolts or nuts with the result that an assembly process is complicated and troublesome. In addition, it is necessary to secure a space for the fastening members, resulting in spatial limitations and weight limitations of the fastening members.

Furthermore, for secondary batteries, such as pouch-shaped batteries, each of which has an electrode assembly mounted therein, a plurality of battery cells is mounted in a cell cover. However, insulation of the secondary batteries is destroyed due to contact between sealed portions of the battery cells and the cell cover with the result that safety of the secondary batteries is lowered.

Therefore, there is a high necessity for a battery pack having a compact structure securing safety that is capable of solving the above problems.

DISCLOSURE

Technical Problem

Therefore, the present invention has been made to solve the above problems and other technical problems that have yet to be resolved.

Specifically, it is an object of the present invention to provide a battery module assembly configured such that cell units are connected in parallel to each other on a per two battery cell basis using bus bars, thereby improving welding reliability and minimizing internal resistance.

It is another object of the present invention to provide a battery module assembly, an assembly process of which is simplified and which is entirely compact and lightweight based on a novel fastening structure to fix battery modules.

It is a further object of the present invention to provide a battery module assembly configured such that insulating tape is attached to an outer circumferential end of a sealed portion of a battery cell for thermal welding so as to surround the outer circumferential end of the sealed portion, thereby improving insulation resistance characteristics of a secondary battery.

Technical Solution

In this specification, a battery module assembly, which will hereinafter be described, is configured to have a structure in which battery modules are arranged on any plane in a height direction such that the battery modules are adjacent to each other.

A battery cell constituting a battery module according to the present invention is a plate-shaped battery cell having electrode terminals formed at one end thereof. The battery cell is formed approximately in the shape of a rectangular parallelepiped. One surface at which the electrode terminals are formed is defined as a front and the other surface opposite to the front is defined as a rear. In addition, the largest two ones of the surfaces excluding the front and the rear are defined as a top and a bottom. The other two surfaces excluding the front, the rear, the top, and the bottom are defined as sides.

Consequently, an upper case and a lower case are assembled to surround opposite sides of the battery cell. Fronts and rears of the upper case and the lower case are defined as surfaces having the same directions as the front and rear of the battery cell.

In accordance with one aspect of the present invention, the above and other objects can be accomplished by the provision of a battery module assembly including two or more battery modules having cell units, each of which includes one or more battery cells having insulating tape at least partially attached to an outer circumference thereof excluding electrode terminals thereof, electrically connected to one another, a pair of an upper case and a lower case to surround an upper part and a lower part of the battery modules in a state in which the battery modules are erected on their sides, a bus bar assembly disposed at a front of the battery modules to electrically connect the battery modules to one another, and fastening holes formed at a top of the upper case and a bottom of the lower case to position or fix the battery module assembly.

That is, in the battery module assembly according to the present invention, the battery modules can be coupled between the upper case and the lower case using a minimum number of members, thereby easily achieving assembly of a battery pack and thus optimizing the space of the battery pack and reducing weight of the battery pack. In particular, in a case in which the battery pack is assembled to have a shelf structure, such as a rack, it is easy to fix the battery pack, thereby securing overall structural stability of the battery pack.

Each of the battery cells is a secondary battery having a small thickness and a relatively large width and length to minimize the overall size of the battery cells when the battery cells are stacked to constitute a battery module. In a preferred example, the secondary battery may be configured to have a structure in which an electrode assembly of a cathode/separator/anode structure is mounted in a battery case formed of a laminate sheet including a resin layer and a metal layer and a cathode terminal and an anode terminal protrude from opposite ends or one end of the battery case. Specifically, the secondary battery may be configured to have a structure in which an electrode assembly is mounted in a pouch-shaped case formed of an aluminum laminate sheet. The secondary battery having the structure as described above may also be referred to as a pouch-shaped battery cell.

In a preferred example, the laminate sheet may be provided at an outer circumference thereof with a sealed portion for thermal welding and the insulating tape may be attached to an outer circumferential end of the sealed portion so as to surround the outer circumferential end of the sealed portion.

In a concrete example, the insulating tape may be attached to the entirety of the outer circumferential end of the sealed portion excluding the electrode terminals so as to surround the entirety of the outer circumferential end of the sealed portion.

Meanwhile, each of the cell units may be configured to have a structure in which the battery cells are mounted between metal housings in a state in which the battery cells are in tight contact with each other.

In the above structure, the metal housings may be coupled to each other to surround the entirety of an outside of a battery cell stack constituted by two or more battery cells excluding cathode and anode terminals of the battery cells. Consequently, the metal housings restrain the deformation of the battery cells due to repetitive expansion and contraction of the battery cells during charge and discharge of the battery cells, while protecting the battery cells, the mechanical strength of which is low, to prevent sealed portions of the battery cells from being separated from each other.

Specifically, each of the metal housings may have an internal structure corresponding to an outside shape of a battery cell stack and, in particular, the metal housings may be coupled to each other in an assembly fastening fashion. For example, the metal housings may be configured to have a male and female fastening structure in which section coupling parts of the metal housings are engaged with each other by elastic coupling when the metal housings are pushed toward each other in a state in which the metal housings are in contact with each other such that the metal housings face each other.

Meanwhile, heat is generated from a secondary battery during the charge and discharge of the secondary battery and effective discharge of the generated heat out of the secondary battery is very important in extending the life span of the secondary battery and securing the safety of the secondary battery. For this reason, each of the metal housings may be made of a metal sheet exhibiting high thermal conductivity, by which heat generated from the battery cells mounted between the metal housings is easily discharged outside.

Each of the metal housings may be provided at an outside thereof with one or more protrusions to define a coolant flow channel.

In a concrete example, each of the protrusions may be formed to have a hexahedral relief structure and at least one of the protrusions may be further provided with a guide groove.

In a preferred example, each of the fastening holes may be configured to have a structure in which a fastening thread is formed at an inner circumference of each of the fastening holes. Consequently, it is possible to easily configure the battery pack to have a rack structure by easily inserting and fastening members, such as bolts, into the fastening holes.

In another preferred example, a depression may be further formed at a rear of the upper case and/or a rear of the lower case such that a bar type member to position or fix the battery module assembly can be coupled in the depression.

Meanwhile, the battery modules may have cell units, each of which includes, preferably, two or more battery cells, connected in parallel to one another.

In addition, each of the cell units may include an even number of battery cells. That is, in a case in which the battery modules are connected in parallel to each other considering capacity of the battery modules, welding is simultaneously performed at the same region during welding between a plurality of electrode terminals or between the electrode terminals and bus bars, resulting in the increase in internal resistance at the welded region.

In the battery module assembly according to the present invention, on the other hand, the battery cells of the cell units are connected in parallel to each other on a per two battery cell basis, thereby improving welding reliability at the welded region. In addition, it is possible to easily achieve parallel connection based on the even number of battery cells.

Electrode terminals of the cell units may be electrically connected to each other via bus bars. Welding may be easily performed based on the cell units including the even number, e.g. two or more, of battery cells.

In a preferred example, the bus bar assembly may include (a) a cover plate formed of an electrically insulative material, the cover plate being fixed to the front of the battery modules, the cover plate including a pair of body parts and (b) a pair of body parts, each of which is configured to have a structure in which an external input and output terminal is formed at an L-shaped side thereof and two or more bus bars diverge from the other side thereof in plane in a state in which the body parts are mounted on the cover plate, and the body parts may be arranged so as to face each other in the direction horizontal to the direction in which the battery modules are arranged.

The body parts may be coupled to the cover plate, preferably, by insert injection molding.

In addition, the body parts may be provided with steps to prevent a short circuit between the external input and output terminals of the battery module assembly. Consequently, the positions of the external input and output terminals may be set based on the steps.

In accordance with another aspect of the present invention, there is provided a middle or large-sized battery pack of high output and large capacity including two or more battery modules based on desired output and capacity.

The battery pack according to the present invention may be manufactured by combining battery module assemblies based on desired output and capacity.

In accordance with a further aspect of the present invention, there is provided a device including the middle or large-sized battery pack.

The device may be an electric vehicle, a hybrid electric vehicle, a plug-in hybrid electric vehicle, or a power storage device in consideration of installation efficiency and structural stability as described above. However, the present invention is not limited thereto.

DESCRIPTION OF DRAWINGS

The above and other objects, features and other advantages of the present invention will be more clearly understood from the following detailed description taken in conjunction with the accompanying drawings, in which:

FIG. 1 is a perspective view showing a battery module assembly according to the present invention;

FIG. 2 is an exploded perspective view of the battery module assembly shown in FIG. 1;

FIG. 3 is a front view of the battery module assembly shown in FIG. 1;

FIG. 4 is a side view of the battery module assembly shown in FIG. 1;

FIG. 5 is a typical view of a cell unit;

FIG. 6 is a partially enlarged view of a battery cell shown in FIG. 5;

FIG. 7 is a plan view of the cell unit shown in FIG. 5;

FIG. 8 is a plan view of the battery cell shown in FIG. 6;

FIG. 9 is a sectional view taken in direction A-A' of FIG. 8;

FIG. 10 is a typical view of a bus bar assembly; and

FIG. 11 is a typical view showing a pair of body parts shown in FIG. 10.

BEST MODE

Now, preferred embodiments of the present invention will be described in detail with reference to the accompanying drawings. It should be noted, however, that the scope of the present invention is not limited by the illustrated embodiments.

FIG. 1 is a perspective view typically showing a battery module assembly according to the present invention and FIG. 2 is an exploded perspective view typically showing the battery module assembly shown in FIG. 1.

Referring to these drawings, the battery module assembly 300 includes eight battery modules 200 having cell units 100, each of which includes two battery cells 10, connected in parallel to one another, a pair of an upper case 210 and a lower case 220 to surround the upper part and the lower part of the battery modules 200 in a state in which the battery modules 200 are erected on their sides, a bus bar assembly 230 disposed at the front of the battery modules 200 to electrically connect the battery modules 200 to one another in parallel, and fastening holes 211, 212, and 221 formed at the front and the top of the upper case 210 and/or the front and the bottom of the lower case 220 to position or fix the battery module assembly 300.

FIG. 3 is a front view typically showing the battery module assembly shown in FIG. 1 and FIG. 4 is a side view typically showing the battery module assembly shown in FIG. 1.

Referring to these drawings together with FIGS. 1 and 2, the fastening holes 211, 212, and 221 are configured to have a structure in which a fastening thread (not shown) is formed at the inner circumference of each of the fastening holes 211, 212, and 221. Consequently, it is possible to fix the battery module assembly to a predetermined region or a predetermined device by inserting and fastening bolts 250 into the fastening holes 211 and 221. In addition, bolts (not shown) are inserted into the fastening holes (not shown) formed at the lower case 220 through the fastening holes 212 formed at the upper case 210 in a downward direction from above based on electrode terminals (see FIG. 5) of the battery module such that the battery module assembly 300 is stably coupled to the upper case 210 and the lower case 220.

In addition, depressions 240 and 241 are formed at the rear of the upper case 210 and the rear of the lower case 220 in a direction (direction A of FIG. 3) horizontal to a direction in which the battery modules 200 are arranged such that bar type members (not shown) to position or fix the battery module assembly 300 can be coupled in the depressions 240 and 241.

FIG. 5 is a typical view of a cell unit and FIG. 6 is a partially enlarged view typically showing a battery cell shown in FIG. 5.

Referring to these drawings, the cell unit 100 includes two battery cells 10. Electrode terminals 11 of each of the battery cells 10 are protrude from one end of each of the battery cells 10. Insulating tape 15 is attached to the outer circumference of each of the battery cells 10 excluding electrode terminals 11 to prevent destruction of insulation resistance due to contact between the battery cells 10 and metal housings 120. Construction of the insulating tape 15 will be hereinafter described in more detail.

Specifically, there is shown a pair of high-strength metal housings 120 configured to have a structure to fully surround the outsides of the two battery cells 10. The metal housings 120 restrain the deformation of the battery cells 10 due to repetitive expansion and contraction of the battery cells 10 during charge and discharge of the battery cells 10, while protecting the battery cells 10, the mechanical strength of which is low, to prevent sealed portions of the battery cells 10 from being separated from each other. The metal housings 120 include a left housing 121 and a right housing 122, which may be coupled to each other without using an additional fastening member.

In addition, each of the metal housings 120 is provided with protrusions 125 to define a coolant flow channel. A portion of each of the outermost corner parts of each of the metal housings 120 is provided with a guide groove 126. Consequently, the battery module assembly 300 is easily fastened while the coolant flow channel is provided between the respective battery modules 200.

FIG. 7 is a plan view typically showing the cell unit of FIG. 5, FIG. 8 is a plan view typically showing the battery cell of FIG. 6, and FIG. 9 is a sectional view taken in direction A-A' of FIG. 8.

Referring to these drawings together with FIGS. 4 to 6, a pair of battery cells 10, each of which has electrode terminals 11 protruding from one end thereof, is received between the high-strength metal housings 120 and insulating tape 150 is attached to the outer circumference of a sealed portion (not shown) of each of the battery cells 10 such that the insulating tape 150 surrounds the outer circumference of the sealed portion of each of the battery cells 10.

Specifically, the battery cells 10 are received in the high-strength metal housings 120 including the left housing 121 and the right housing 122 which are coupled to each other in a state in which the insulating tape 150 is attached to opposite sides of the outer circumference of each of the battery cells 10 excluding the electrode terminals 11 to constitute one cell unit 100. Consequently, it is possible to fundamentally prevent destruction of insulation resistance due to contact between the battery cells 10 and high-strength metal housings 120.

FIG. 10 is a typical view of a bus bar assembly according to an embodiment of the present invention and FIG. 11 is a typical view showing a pair of body parts shown in FIG. 10.

Referring to these drawings together with the other drawings, the bus bar assembly 230 includes a cover plate 231 and body parts 232.

The cover plate 231 is formed of an electrically insulative material. The cover plate 231 is fixed to the front of the battery modules 200. The cover plate 231 includes a pair of body parts 232. Consequently, the electrode terminals 11 of the cell units 100 are electrically connected to each other via bus bars 233.

Each body part 232 is configured to have a structure in which an external input and output terminal 234 is formed at an L-shaped side thereof and two or more bus bars 233 diverge from the other side thereof in plane in a state in which the body parts 232 are coupled to the cover plate 231 by insert injection molding.

The body parts 232 and 232' are arranged so as to face each other in the direction (direction A of FIG. 3) horizontal to the direction in which the battery modules 200 are arranged.

The body parts 232 are provided with steps to prevent a short circuit between the external input and output terminals 234 and 234'. Consequently, the positions of the external input and output terminals 234 and 234' may be set based on the steps.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery module assembly according to the present invention is configured such that the cell units are connected in parallel to each other on a per two battery cell basis using the bus bars, thereby improving welding reliability.

In addition, the battery modules are fixed through the fastening holes formed at the front of the upper case and/or the front of the lower case of the battery module assembly, thereby easily achieving assembly of the battery pack and manufacturing the battery pack with high spatial utilization.

Meanwhile, the battery module assembly according to the present invention is configured such that the insulating tape is attached to the outer circumferential end of the sealed portion of each of the battery cells for thermal welding so as to surround the outer circumferential end of the sealed portion, thereby improving insulation resistance characteristics of a secondary battery.

The invention claimed is:
1. A battery module assembly comprising:
two or more battery modules having cell units, wherein each cell unit comprises one or more battery cells having an adhesive insulating tape adhesively attached to an outer circumference thereof excluding electrode terminals thereof and being electrically connected to one another;
a metal housing comprising an upper case and a lower case surrounding an upper part and a lower part of a stack of said two or more battery modules erected on their sides;
a bus bar assembly disposed at a front of the battery modules to electrically connect the battery modules to one another; and
fastening holes formed at a top of the upper case and a bottom of the lower case to position or fix the battery module assembly,
wherein each of the battery cells is configured such that an electrode assembly of a cathode/separator/anode structure is mounted in a battery case formed of a laminate sheet comprising a resin layer and a metal layer and that a cathode terminal and an anode terminal protrude from one end or opposite ends of the battery case, and
wherein the laminate sheet is provided at an outer circumference thereof with a sealed portion for thermal welding, and the adhesive insulating tape is adhesively attached to the entirety of an outer circumference of the sealed portion excluding the electrode terminals so as to surround the entirety of the outer circumference of the sealed portion.

2. The battery module assembly according to claim 1, wherein each cell unit has a structure in which the respective battery cells are mounted in said metal housing in a state in which the battery cells are in tight contact with each other.

3. The battery module assembly according to claim 2, wherein the metal housing is provided at an outside thereof with one or more protrusions to define a coolant flow channel.

4. The battery module assembly according to claim 3, wherein each of the protrusions is formed to have a hexahedral relief structure.

5. The battery module assembly according to claim 3, wherein at least one of the protrusions is further provided with a guide groove.

6. The battery module assembly according to claim 1, wherein a fastening thread is formed at an inner circumference of each of the fastening holes.

7. The battery module assembly according to claim 1, wherein a depression is further formed at a rear of the upper case and/or a rear of the lower case such that a bar type member to position or fix the battery module assembly can be coupled in the depression.

8. The battery module assembly according to claim 7, wherein the depression is formed at the rear of the upper case and/or the rear of the lower case in a direction horizontal to a direction in which the battery modules are arranged.

9. The battery module assembly according to claim 1, wherein the battery modules have cell units, each of which comprises two or more battery cells, connected in parallel to one another.

10. The battery module assembly according to claim 1, wherein each of the cell units comprises an even number of battery cells.

11. The battery module assembly according to claim 1, wherein electrode terminals of the cell units are electrically connected to each other via bus bars.

12. The battery module assembly according to claim 1, wherein the bus bar assembly comprises:
(a) a cover plate formed of an electrically insulative material, the cover plate being fixed to the front of the battery modules, the cover plate comprising a pair of body parts; and
(b) the pair of body parts, each of which is configured to have a structure in which an external input and output terminal is formed at an L-shaped side thereof and two or more bus bars diverge from the other side thereof in a state in which the body parts are mounted on the cover plate, and
the pair body parts are arranged so as to face each other in a direction horizontal to a direction in which the battery modules are arranged.

13. The battery module assembly according to claim 12, wherein the pair body parts are coupled to the cover plate by insert injection molding.

14. The battery module assembly according to claim 13, wherein the pair body parts are provided with steps to prevent a short circuit between the external input and output terminals.

15. A battery pack configured to have a structure comprising two or more battery module assemblies according to claim 1 based on output and capacity.

16. A device comprising a battery pack according to claim 15.

17. The device according to claim 16, wherein the device is an electric vehicle, a hybrid electric vehicle, or a plug-in hybrid electric vehicle.

* * * * *